United States Patent [19]

Dray

[11] Patent Number: 4,842,414
[45] Date of Patent: Jun. 27, 1989

[54] MIXING DEVICE FOR A FEED SCREW

[76] Inventor: Robert F. Dray, Box 273M, Route #1, Hamilton, Tex. 76531

[21] Appl. No.: 97,192

[22] Filed: Sep. 16, 1987

[51] Int. Cl.[4] .............................. B01F 7/08; B29B 7/42
[52] U.S. Cl. ........................................ 366/82; 366/89; 366/90; 366/322; 366/323
[58] Field of Search .................... 366/79, 80, 81, 82, 366/90, 318, 319, 279, 323, 324, 89, 322; 425/208, 209, 207

[56] References Cited

U.S. PATENT DOCUMENTS

| | | | |
|---|---|---|---|
| 3,175,248 | 3/1965 | Swenson | 366/79 |
| 3,719,351 | 3/1973 | Upmeier | 366/82 |
| 3,721,427 | 3/1973 | Upmeier | 366/82 |
| 3,957,256 | 5/1976 | Murakami | 366/81 |
| 4,007,922 | 2/1977 | Tamura | 366/81 |
| 4,388,262 | 6/1983 | Brasz et al. | 366/81 |
| 4,444,507 | 4/1984 | Dray | 366/81 |

FOREIGN PATENT DOCUMENTS

| | | | |
|---|---|---|---|
| 2558238 | 7/1977 | Fed. Rep. of Germany | 425/208 |
| 0108118 | 6/1983 | Japan | 425/208 |

*Primary Examiner*—Harvey C. Hornsby
*Assistant Examiner*—Joseph S. Machuga
*Attorney, Agent, or Firm*—Stephen Ross Green

[57] ABSTRACT

This invention relates to a mixing device for a feed screw for melting and conveying plasticated material of the type which rotates about a longitudinal axis in a barrel of an apparatus for melting and conveying plasticated material. The feed screw includes consecutive feed, transition, and metering sections, and further includes at least one helical main channel for conveying material in a downstream direction. The mixing device includes a cylinder having a clearance from the inside of the barrel, which cylinder rotates with the feed screw about said axis within the barrel. The outer surface of the cylinder is provided with at least one continuous mixing channel which extends over the surface of the cylinder, the channel being disposed in alternate upstream and downstream directions wherein material conveyed in the mixing channel is caused to alternately reverse its direction while proceeding through the mixing channel. An inlet is provided to admit material from the main channel of the feed screw into the mixing channel. An outlet is also provided to return said material from the mixing channel into the main channel of said feed screw. Because the material is caused to alternately reverse the direction of its flow external to the screw, improved mixing of the material being processed is obtained.

4 Claims, 2 Drawing Sheets

MIXING DEVICE FOR A FEED SCREW

This invention relates to a mixing device for a feed screw.

More specifically, this invention relates to a mixing device for a feed screw for melting and conveying plasticated material of the type which rotates about a longitudinal axis in a barrel of an apparatus for melting and conveying plasticated material. The feed screw includes consecutive feed, transition, and metering sections, and further includes at least one helical main channel for conveying material in a downstream direction. The mixing device includes a cylinder having a clearance from the inside of the barrel, which cylinder rotates with the feed screw about said axis within the barrel. The outer surface of the cylinder is provided with at least one continuous mixing channel which extends over the surface of the cylinder, the channel being disposed in alternate upstream and downstream directions wherein material conveyed in the mixing channel is caused to alternately reverse its direction while proceeding through the mixing channel. An inlet is provided to admit material from the main channel of the feed screw into the mixing channel. An outlet is also provided to return said material from the mixing channel into the main channel of said feed screw. Because the material is caused to alternately reverse the direction of its flow external to the screw, improved mixing of the material being processed is obtained.

As plasticated material is processed at increasingly higher rates, it is important that uniformity of the temperature and viscosity of the melt be maintained. At the same time, there is the danger with excessively high shear rates, that degradation of the material may occur.

As an attempt to alleviate this problem, the prior art discloses several mixing sections for feed screws which attempt to increase the distributive mixing as the material proceeds along the screw. Several designs force the material to cross a barrier by terminating one or more channels through which the material passes thereby forcing the material over the barrier into the adjacent channel and on to the discharge end of the screw. As the material is forced over this barrier, the higher shear rates assist in both the disbursive mixing and distributive mixing efforts.

Some care must be used in the design of these sections since the increased shear rates can have a detrimental effect on materials that degrade easily. In addition, the relatively small clearance between the barrier and the inside of the barrel within which the screw rotates produces pressure effects downstream from the section which must be accounted for when selecting the temperature profile of the barrel and the rotational speed of the screw.

It is therefore, an object of this invention to provide a feed screw having a mixing device capable of providing effective and efficient mixing without adverse pressure effects on the material be processed.

Another object of this invention is to provide a mixing device for a feed screw which does not subject the material to excessively higher shear rates and thus risk degradation of the material being processed.

Still another object is to provide a longer residence time for the material within the screw channel to achieve more complete melting.

SUMMARY OF THE INVENTION

In the fulfillment of the foregoing objects, the present invention provides a mixing section for a feed screw which includes at least open continuous mixing channel extending over the surface of the mixing section. The feed screw is of the type which is rotatable within a barrel of a plasticating apparatus, and includes consecutive feed, transition, and metering sections. In the vicinity of the metering section a mixing device is located which includes a cylinder having an outer surface which is rotatable about the axis of the screw within the barrel. The cylinder has a predetermined clearance from the inside surface of the barrel. A continuous mixing channel extends over the surface of the cylinder and is disposed in alternate upstream and downstream directions so that the material conveyed through the mixing channel follows a circuitous route and is caused to alternately reverse its direction as it proceeds through the mixing channel. An inlet is provided from a main channel of the feed screw into the mixing channel, and in addition, an outlet is provided so the material in the mixing channel can return to the main channel of the screw.

DESCRIPTION OF THE DRAWINGS

Other objects and advantages of the present invention will be apparent from the ensuing description in the illustrative embodiment thereof in the course of which reference is made to the accompanying drawings in which.

DESCRIPTION OF THE PREFERRED EMBODIMENT

Figure 1:
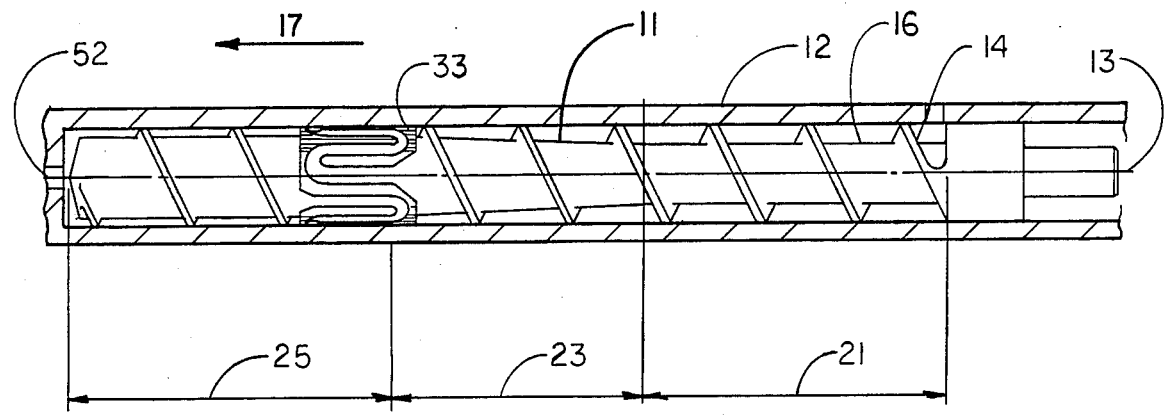
FIG. 1 is an elevational view of a feed screw embodying a mixing device of the type described herein.

Reference is now made to FIG. 1 of the drawings which depicts a plasticating feed screw generally indicated by reference numeral 11. Screw 11 is rotated by a drive mechanism which is not illustrated but is well known in the prior art within cylindrical barrel 12 of a plasticating apparatus about longitudinal axis 13 which is generally concentric with barrel 12 and feed screw 11. Feed screw 11 includes a helical flight 14 which defines a helical main channel 16 between consecutive turns thereof. Feed screw 11 is shown as having consecutive feed section 21, transition section 23, and metering section 26. In these sections, the depth of channel 16 gradually increases in a downstream direction, such direction being indicated by reference numeral 17.

Figure 2:
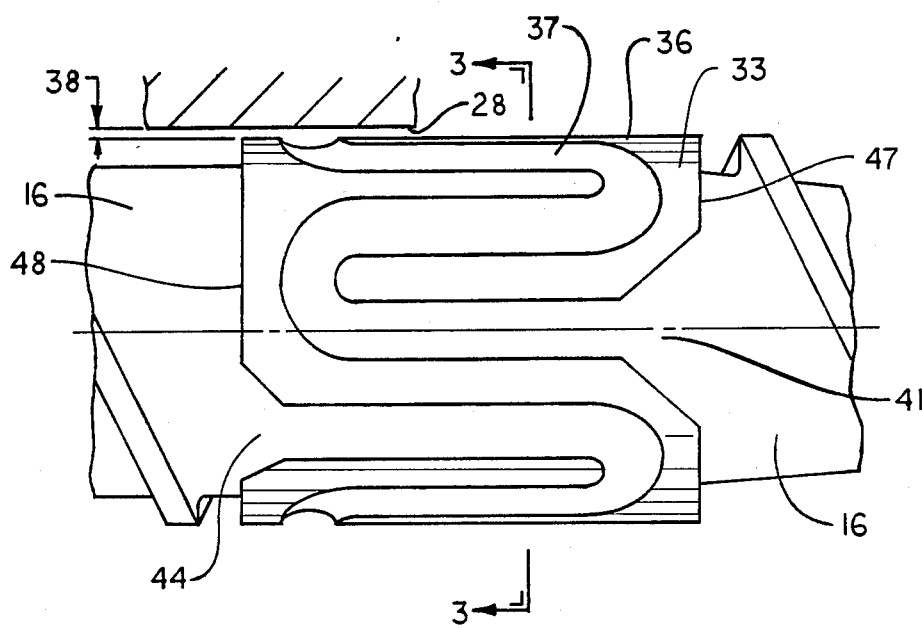
FIG. 2 is an enlarged detailed view of a mixing device embodying the hereindescribed invention which figure includes a fragmentary section of a portion of a barrel.
Figure 3:
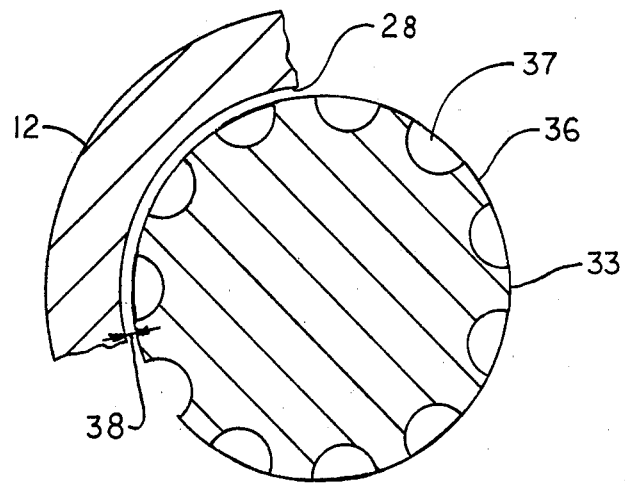
FIG. 3 is a sectional view along lines 3—3 of FIG. 2 and includes a fragmentary section of a portion of a barrel.

A mixing device of the type to be specifically described herein, is indicated generally by reference numeral 33, and may be located at the downstream end of transition section 23 in the vicinity of the beginning of metering section 25, metering section 25 being located in a downstream direction from transition section 23. Referring now to FIG. 2 in conjunction with FIG. 3, mixing device 33 is shown as being generally cylindrical and having a diameter comparable to the diameter of flight 14. In practice, the diameter of mixing device 33 may be slightly less than the diameter of flights 14 to provide a clearance 38 between the cylindrical surface 36 of mixing device 33 and the inside surface 28 of barrel 12. The clearance 38 between the inside surface 28 of barrel 12 and the surface 36 of mixing section 33 may be seen in exaggerated form in FIGS. 2 and 3. Extending over surface 36 of mixing device 33, is a continuous mixing channel indicated by reference numeral 37. In addition, the upstream end 47 of mixing section 33 has a converging inlet indicated by reference numeral 41 and a diverging outlet 44 on the downstream end 48 of mixing device 33.

Figure 4:
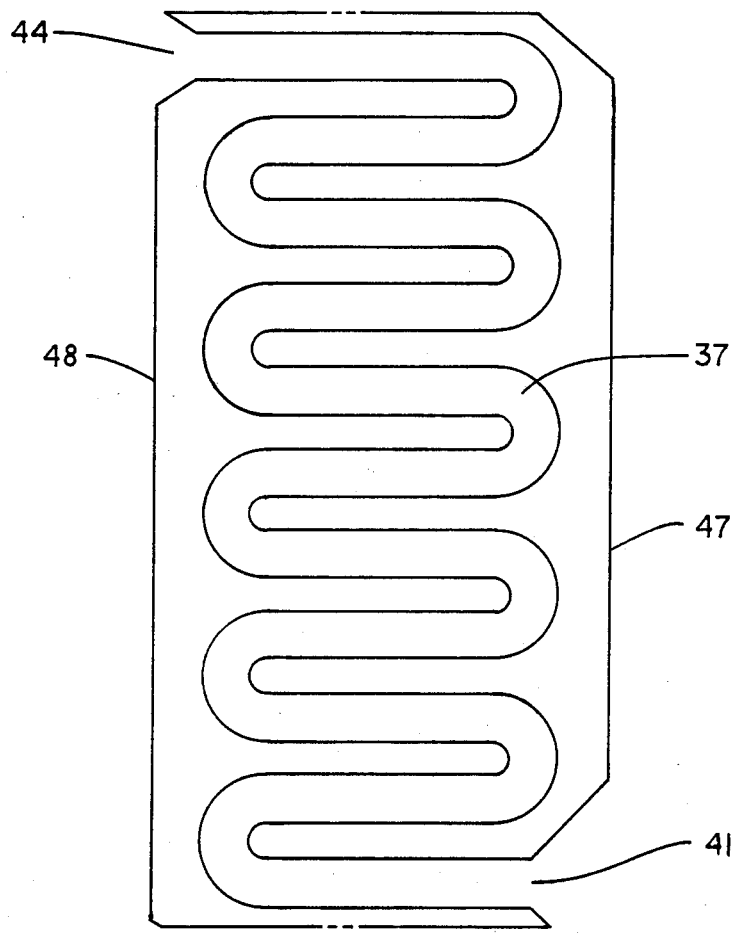
FIG. 4 is a developed or "unwrapped" view of a mixing device embodying the hereindescribed invention.

At this point, reference is directed to FIG. 2 in conjunction with FIG. 4. Mixing channel 37 extends over mixing device 33 and is disposed alternately upstream and downstream around cylindrical surface 36 of mixing device 33, providing a plurality of alternate reversals in the direction of mixing channel 37. It is readily evident from FIGS. 1 and 2 that the alternate upstream and downstream reversals of mixing channel 37 are parallel to longitudinal axis 13. As indicated above, inlet 41 is on the upstream side 47 of mixing device 33 and serves to permit plasticated materials to proceed from main channel 16 into mixing channel 37. In a similar manner, outlet 44 permits material in mixing channel 37 to proceed back into main channel 16. The configuration and number of alternate reversals of mixing channel 37 is selected according to the characteristics of the material being processed and so that mixing channel 37 terminates at outlet 44 on downstream side 48 of mixing section 33. The greater the number of reversals of mixing channel 37, the greater its length. As may further be seen in FIG. 4, mixing channel 37 is continuous and may be machined integrally with cylindrical surface 36 of mixing section 33. In addition, referring back to FIG. 3, it may be seen that mixing channel 37 has a cross-section which is approximately semi-circular.

OPERATION

As screw 11 rotates, material in channel 16 is conveyed in a downstream direction 17 and undergoes melting similar to that known in the prior art. Material enters inlet 41 of mixing device 33 from main channel 16 of transition section 23 and proceeds in alternate upstream and downstream directions throughout the length of mixing channel 37. Due to the length of mixing channel 37, which is significantly greater than the actual length of mixing device 33, the time in which the material is processed in the apparatus is increased. In addition, a small portion of the material is forced through clearance 38 and experiences higher shearing rates which assists in the melting process while not appreciably increasing the risk of degradation of the material since a greater portion of the material passes through mixing channel 37 which presents less of a restriction to material flow than clearance 38. Upon leaving mixing channel 37, the material passes through outlet 44 into the continuation of main channel 16 in metering section 26 where it proceeds to discharge end 52 of the screw. Because mixing channel 37 presents no barriers for the material to cross over other than the small amount of material passing through clearance 38, the material experiences no abnormal shear consequences or adverse pressure effects.

Thus, it may be seen from the foregoing description that a mixing device for a feed screw has been provided which does not adversely affect the pressure distribution along the screw.

In addition, the material is not subjected to adverse shear rates, but rather experiences thorough and effective mixing due to the alternating reversal of the flow of material through the circuitous mixing channel over the surface of the mixing device and the increased residence time of the material in the screw channel.

Although but one embodiment of the present invention has been illustrated and described, it should be apparent to those skilled in the art that various changes and modifications can be made to these embodiments without departing from the spirit and scope of the invention.

I claim:

1. A mixing device for a feed screw rotatable within a cylindrical barrel of an apparatus for melting and conveying plasticated material, said barrel having an inside surface, said feed screw including at least consecutive feed, transition and metering sections, said feed screw further including at least one helical main channel for conveying plasticated material in a downstream direction and a longitudinal axis for rotation, said mixing device comprising:
   (a) cylinder means rotatable with said feed screw about said axis within said barrel and further having a predetermined clearance between said inside suirface of said barrel and an outer surface of said cylinder means, said cylinder means interposed between an upstream section of said main channel and a downstream section of said main channel;
   (b) a continuous mixing channel extending over said outer surface of said cylinder means, said mixing channel being disposed in a circuitous route such that material conveyed in said mixing channel experiences a plurality of reversals in its direction parallel to said longitudinal axis while said material passes around said outer surface of said cylinder means within said mixing channel;
   (c) said mixing channel having a converging inlet for receiving of all said material from said upstream section of said main channel into said mixing channel of said cylinder means; and
   (d) said mixing channel having a diverging outlet for delivering said material from said mixing channel into said downstream section of said main channel.

2. The mixing device of claim 1 wherein said continuous mixing channel is disposed in a plurality of alternate upstream and downstream directions.

3. The mixing device of claim 2 a wherein said mixing channel has a cross section which is substantially semi-circular.

4. A mixing device for a feed screw rotatable within a cylindrical barrel of an apparatus for melting and conveying plasticated material, said barrel having an inside surface, said feed screw including at least consecutive feed, transition and metering sections, said feed screw further including at least one helical main channel for conveying plasticated material in a downstream direction and a longitudinal axis for rotation, said mixing device comprising:
   (a) a cylinder rotatable with said feed screw about said axis within said barrel and further having a predetermined clearance between said inside surface of said barrel and an outer surface of said cylinder, said cylinder interposed between said transition section of said main channel and said metering section of said main channel, said metering section being located downstream from said transition section;

(b) a continuous mixing channel having a semi-circular cross-section and extending over said outer surface of said cylinder, said mixing channel being disposed in alternate upstream and downstream directions parallel to said longitudinal axis such that material conveyed in said mixing channel is subjected to a plurality of alternate reversals in its direction as said material passes around said outer surface of said cylinder within said mixing channel;

(c) said mixing channel having a converging inlet for receiving all of said material from said main channel of said transition section into said mixing channel of said cylinder; and (d) said mixing channel having a diverging outlet for delivering said material from said mixing channel into said main channel of said metering section.

* * * * *